(12) United States Patent
Kang et al.

(10) Patent No.: US 10,796,855 B2
(45) Date of Patent: Oct. 6, 2020

(54) MULTILAYER CAPACITOR

(71) Applicant: SAMSUNG ELECTRO-MECHANICS CO., LTD., Suwon-si, Gyeonggi-do (KR)

(72) Inventors: Sung Hyung Kang, Suwon-si (KR); Yong Koo Kim, Suwon-si (KR); Hyung Kyu Kim, Suwon-si (KR); Won Hee Yoo, Suwon-si (KR); Jong Hyun Cho, Suwon-si (KR); Byung Kil Yun, Suwon-si (KR); Seok Kyoon Woo, Suwon-si (KR); Hyun Sung Dong, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 50 days.

(21) Appl. No.: 16/184,337

(22) Filed: Nov. 8, 2018

(65) Prior Publication Data

US 2020/0058443 A1 Feb. 20, 2020

(30) Foreign Application Priority Data

Aug. 16, 2018 (KR) .................. 10-2018-0095253

(51) Int. Cl.
| | |
|---|---|
| *H01G 4/232* | (2006.01) |
| *H01G 4/248* | (2006.01) |
| *H01G 4/30* | (2006.01) |
| *H01G 4/008* | (2006.01) |
| *H01G 4/12* | (2006.01) |

(52) U.S. Cl.
CPC ........... *H01G 4/2325* (2013.01); *H01G 4/248* (2013.01); *H01G 4/30* (2013.01); *H01G 4/0085* (2013.01); *H01G 4/1227* (2013.01)

(58) Field of Classification Search
None
See application file for complete search history.

(56) References Cited

U.S. PATENT DOCUMENTS

| | | | | |
|---|---|---|---|---|
| 2005/0067744 | A1* | 3/2005 | Miura | B32B 18/00 264/619 |
| 2007/0117338 | A1* | 5/2007 | Yamamoto | H01L 23/49822 438/396 |
| 2011/0193448 | A1* | 8/2011 | Saruban | H01G 4/005 310/311 |
| 2012/0154977 | A1 | 6/2012 | Hur et al. | |

(Continued)

FOREIGN PATENT DOCUMENTS

| | | |
|---|---|---|
| JP | 2009-147178 A | 7/2009 |
| KR | 10-0691248 | 3/2007 |
| KR | 2012-0068622 A | 6/2012 |

*Primary Examiner* — Dion Ferguson
(74) *Attorney, Agent, or Firm* — Morgan, Lewis & Bockius LLP (57) ABSTRACT

A multilayer capacitor includes a body, including a stacked structure formed of a plurality of dielectric layers and a plurality of internal electrodes, and a plurality of external electrodes. Each external electrode includes a conductive layer, disposed at the end of the body and connected to the plurality of internal electrodes, and a plating layer covering the conductive layer. Each conductive layer includes nickel (Ni) and barium titanate (BT), and an area occupied by nickel with respect to the total area of the respective conductive layer is 30% to 65%.

19 Claims, 4 Drawing Sheets

(56) References Cited

U.S. PATENT DOCUMENTS

| | | | |
|---|---|---|---|
| 2015/0170786 A1* | 6/2015 | Hong | H01B 1/24 |
| | | | 174/260 |
| 2017/0076870 A1* | 3/2017 | Noda | H01G 4/30 |
| 2018/0233289 A1* | 8/2018 | Nagai | H01G 4/12 |
| 2018/0265413 A1* | 9/2018 | Okamoto | H01G 4/12 |
| 2019/0066923 A1* | 2/2019 | Jung | H01G 4/308 |

* cited by examiner

MULTILAYER CAPACITOR

CROSS-REFERENCE TO RELATED APPLICATION

This application claims benefit of priority to Korean Patent Application No. 10-2018-0095253 filed on Aug. 16, 2018 in the Korean Intellectual Property Office, the disclosure of which is incorporated herein by reference in its entirety.

BACKGROUND

1. Field

The present disclosure relates to a multilayer capacitor (or a multilayer ceramic capacitor).

2. Description of Related Art

Multilayer capacitors have a small size, provide high capacity, and facilitate mounting. Therefore, multilayer capacitors are commonly applied to circuit boards of video displayers such as liquid crystal displays (LCDs), plasma display panels (PDPs), and the like, and electronic products such as computers, smartphones, cellular phones, and the like, to charge or discharge electricity.

In related multilayer capacitors, a body is prepared and sintered using barium titanate ($BaTiO_3$) as a main material and including internal electrodes formed of nickel (Ni), and a conductive paste including copper (Cu) is applied to one surface of the body to which the internal electrodes are exposed through a dipping method, and sintered to form external electrodes.

Here, the copper component of the external electrodes comes into contact with a nickel component of the internal electrodes to realize electrical characteristics.

Therefore, a first sintering step of sintering a body including a dielectric layer and the internal electrodes and a second sintering step of forming the external electrodes and sintering the external electrodes again are required, and thus, a manufacturing process is lengthened.

In order to attach the external electrodes to one surface of the body, glass is commonly included in the conductive paste.

The glass may cause cracks during the sintering process and may allow plating liquid to penetrate into the body due to elution of the glass during the plating process.

As a result, physical properties of the multilayer capacitor may be degraded and moisture resistance reliability may be deteriorated.

SUMMARY

An aspect of the present disclosure may provide a multilayer capacitor having enhanced moisture resistance reliability.

According to an aspect of the present disclosure, a multilayer capacitor may include a body, including a stacked structure formed of a plurality of dielectric layers and a plurality of internal electrodes, and a plurality of external electrodes. Each external electrode includes a conductive layer, disposed at a respective end of the body and connected to a respective portion of the plurality of internal electrodes, and a plating layer covering the conductive layer. In each external electrode, the conductive layer includes nickel (Ni) and barium titanate (BT), and an area occupied by nickel with respect to the total area of the conductive layer is 30% to 65%.

An area occupied by nickel with respect to a total area of the conductive layer may be 40% to 55%.

The multilayer capacitor may further include a conductive resin layer disposed between the conductive layer and the plating layer.

The plating layer may include a copper (Cu) plating layer, a nickel plating layer covering the copper plating layer, and a tin (Sn) plating layer covering the nickel plating layer.

The plating layer may include a nickel plating layer and a tin plating layer covering the nickel plating layer.

The plating layer may be a tin plating layer.

In the body, an average thickness of the plurality of dielectric layers may be less than 2.8 μm, an average thickness of the plurality of internal electrodes may be less than 1 μm, and the average thickness of the plurality of dielectric layers may be equal to twice the average thickness of the plurality of internal electrodes.

Each of the plurality of external electrodes may include a lead portion, formed on the respective end surface of the body and connected to the respective portion of the plurality of internal electrodes, and a band portion extending from the lead portion to a portion of a mounting surface of the body.

The multilayer capacitor may further include a conductive resin layer disposed between the conductive layer and the plating layer. A distance from an end surface of the body to an end of the band portion of the conductive layer is shorter than a distance from the end surface of the body to an end of the band portion of the conductive resin layer.

The body may include first and second surfaces opposing each other and third and fourth surfaces connected to the first and second surfaces and opposing each other, and may include the plurality of internal electrodes disposed to be alternately exposed to the third and fourth surfaces of the body with the dielectric layer interposed therebetween.

In accordance with a further aspect of the disclosure, a multilayer capacitor includes a body, including a plurality of internal electrodes alternately stacked with dielectric layers therebetween, and first and second external electrodes disposed on opposing end surfaces of the body and contacting internal electrodes of the plurality of internal electrodes. The first and second external electrodes each includes a conductive layer including nickel (Ni) and with a material composition such that, in a cross-section of the conductive layer, an area occupied by the nickel is 30% to 65% of the total area of the cross section.

The conductive layer of each of the first and second external electrodes may include nickel (Ni) and barium titanate (BT).

The conductive layer of each of the first and second external electrodes that includes nickel (Ni) may directly contact internal electrodes of the plurality of internal electrodes of the multilayer capacitor.

The conductive layer of each of the first and second external electrodes may include 30 vol % to 65 vol % of nickel (Ni) relative to 100 vol % of the conductive layer.

The conductive layer of each of the first and second external electrodes may include 40 vol % to 55 vol % of nickel (Ni) relative to 100 vol % of the conductive layer.

The plurality of internal electrodes may include pluralities of first and second internal electrodes that are alternately stacked with the dielectric layers therebetween, the first external electrode may contact only the first internal electrodes from among the first and second internal electrodes, and the second external electrode may contact only the second internal electrodes from among the first and second internal electrodes.

Each of the first and second external electrodes may include the conductive layer in direct contact with the body and at least one plating layer including tin (Sn) covering the conductive layer.

Each of the first and second external electrodes may further include a plating layer including copper (Cu) directly covering the conductive layer, a plating layer including nickel (Ni) directly covering the plating layer including copper (Cu), and the plating layer including tin (Sn) directly covering the plating layer including nickel (Ni).

Each of the first and second external electrodes may further include a resin layer disposed between the conductive layer including nickel (Ni) and the at least one plating layer covering the conductive layer.

The resin layer may extend over an entire surface and ends of the conductive layer including nickel (Ni) to directly contact a surface of the body.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

Figure 1:
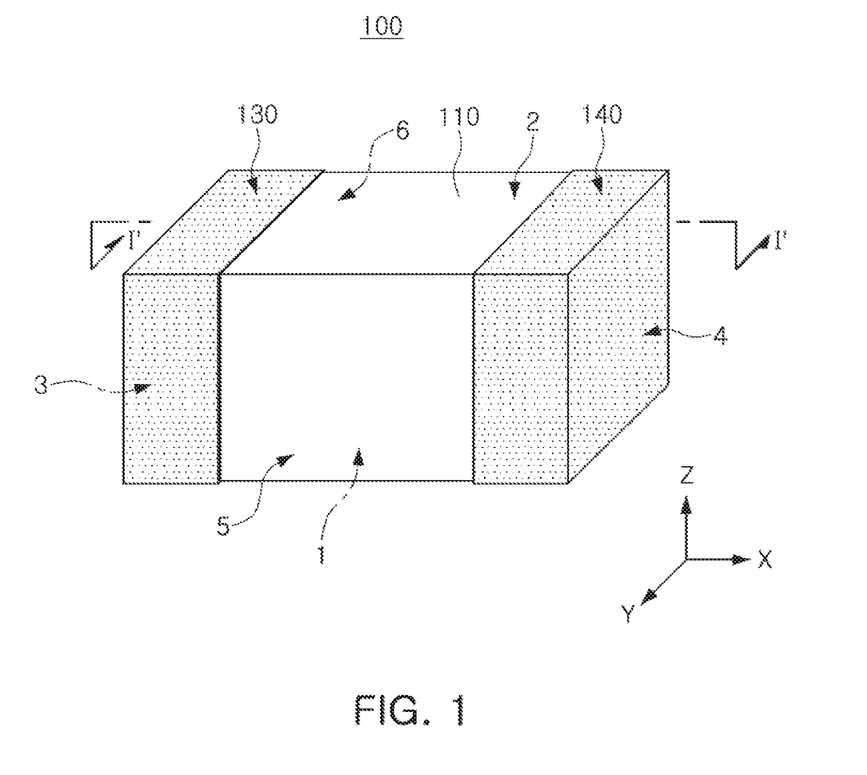
FIG. 1 is a schematic perspective view illustrating a multilayer capacitor according to an exemplary embodiment.
Figure 2A:
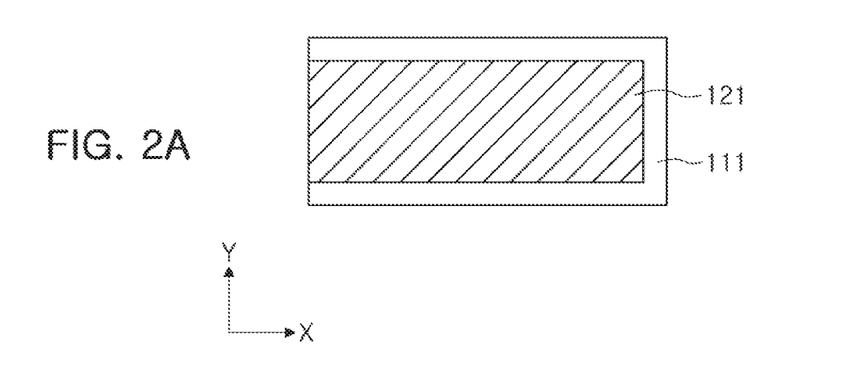
FIGS. 2A and 2B are plan views of first and second internal electrodes, respectively, of the multilayer capacitor of FIG. 1.
Figure 2B:
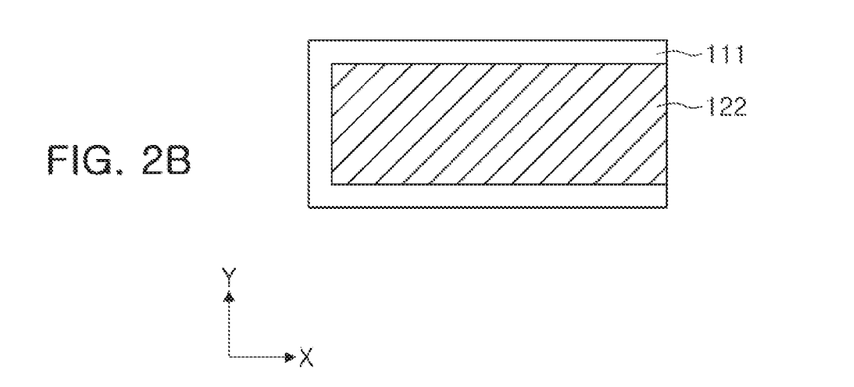
Figure 3:
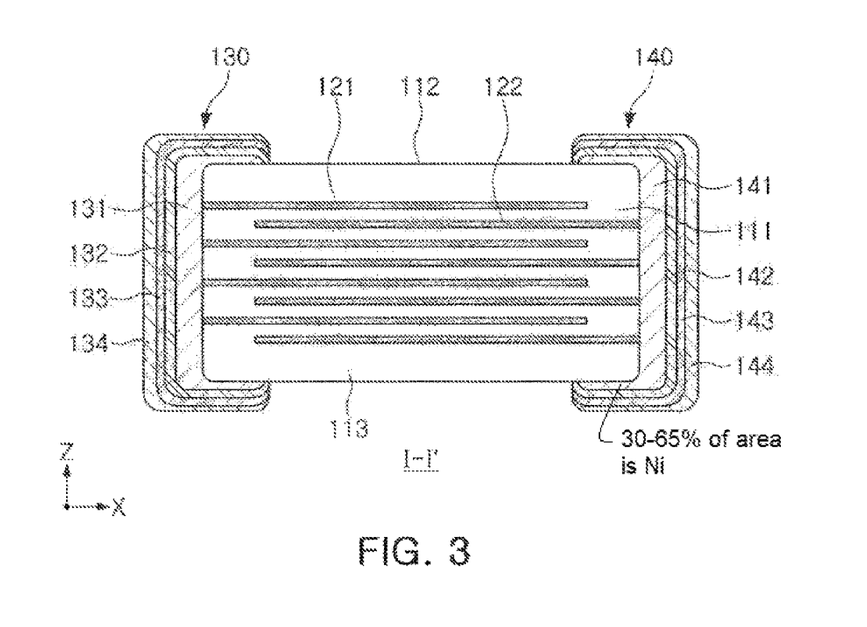
FIG. 3 is a cross-sectional view taken along line I-I' of the multilayer capacitor of FIG. 1.

FIG. 1 is a schematic perspective view illustrating a multilayer capacitor according to an exemplary embodiment, FIGS. 2A and 2B are plan views of first and second internal electrodes of the multilayer capacitor of FIG. 1, respectively, and FIG. 3 is a cross-sectional view taken along line I-I' of FIG. 1.

Referring to FIGS. 1, 2A, 2B, and 3, a multilayer capacitor 100 according to the present exemplary embodiment includes a body 110 including a stacked structure formed of a plurality of dielectric layers 111 and pluralities of alternately stacked first and second internal electrodes 121 and 122, and first and second external electrodes 130 and 140.

The body 110 is formed by stacking a plurality of dielectric layers 111 in the Z direction and subsequently sintering the same, and adjacent dielectric layers 111 of the body 110 may be integrated such that boundaries therebetween may not be readily apparent without using a scanning electron microscope (SEM).

Here, the body 110 may have a substantially hexahedral shape, but the present disclosure is not limited thereto.

The shape and dimensions of the body 110 and the number of stacked dielectric layers 111 is not limited to that illustrated in the drawings of the present exemplary embodiment.

In the present exemplary embodiment, for the purposes of description, surfaces of the body 110 opposing each other in the Z direction are defined as first and second surfaces 1 and 2, surfaces of the body 110 connected to the first and second surfaces 1 and 2 and opposing each other in the X direction are defined as third and fourth surfaces 3 and 4, and surfaces of the body 110 connected to the first and second surfaces 1 and 2, connected to the third and fourth surfaces 3 and 4, and opposing each other in the Y direction are defined as fifth and sixth surfaces 5 and 6.

Further, in this exemplary embodiment, a mounting surface of the multilayer capacitor 100 may be the first surface 1 of the body 110.

The dielectric layers 111 may include a ceramic material having a high dielectric constant. For example, the dielectric layers 111 may include a barium titanate ($BaTiO_3$)-based or a strontium titanate ($SrTiO_3$)-based ceramic powder, or the like, but the present disclosure is not limited thereto as long as sufficient capacitance is obtained.

In addition, a ceramic additive, an organic solvent, a plasticizer, a binder, a dispersant, and the like may be further added to the dielectric layer 111 together with the ceramic powder.

The ceramic additive may be, for example, a transition metal oxide or a transition metal carbide, a rare earth element, magnesium (Mg), aluminum (Al), or the like.

The body 110 includes an active region serving as a portion contributing to capacitance formation of the capacitor. The body 110 further includes upper and lower covers 112 and 113 formed, as upper and lower marginal portions of the active region in the Z direction, respectively, on upper and lower surfaces of the active region.

The upper and lower covers 112 and 113 may have the same material and configuration as those of the dielectric layer 111, except that they do not include internal electrodes.

The upper and lower covers 112 and 113 may be formed by stacking a single dielectric layer or two or more dielectric layers on the upper and lower surfaces of the active region in the Z direction, respectively, and basically serve to prevent damage to the first and second internal electrodes 121 and 122 due to physical or chemical stress.

The first and second internal electrodes 121 and 122, which are electrodes to which opposite polarities are applied, are alternately arranged in the Z direction with the dielectric layer 111 interposed therebetween. One end of each of the first and second internal electrodes 121 and 122 may be exposed to a respective one of the third and fourth surfaces 3 and 4 of the body 110.

Here, the first and second internal electrodes 121 and 122 may be electrically insulated from each other by the dielectric layer 111 disposed therebetween.

The ends of the first and second internal electrodes 121 and 122, alternately exposed to the third and fourth surfaces 3 and 4 of the body 110, may be electrically connected to the first and second external electrodes 130 and 140 disposed on the third and fourth surfaces 3 and 4 of the body 110, respectively.

With the configuration described, when a predetermined voltage is applied to the first and second external electrodes 130 and 140, charges are accumulated between the first and second internal electrodes 121 and 122.

Here, capacitance of the multilayer capacitor 100 is proportional to the area of the first and second internal electrodes 121 and 122 which overlap each other in the Z direction, in the active region.

A material used to form the first and second internal electrodes 121 and 122 is not limited. For example, the first and second internal electrodes 121 and 122 may be formed of a conductive paste including precious metals such as platinum (Pt), palladium (Pd), a palladium-silver (Pd—Ag) alloy, and the like, and one or more materials among nickel (Ni) and copper (Cu).

Here, the conductive paste may be printed by a screen printing method or a gravure printing method, but the present disclosure is not limited thereto.

Meanwhile, in the body 110 of the present exemplary embodiment, an average thickness of the dielectric layers 111 is less than 2.8 µm, an average thickness of the first and second internal electrodes 121 and 122 is less than 1 µm, and the average thickness of the dielectric material layers 111 may be equal to or greater than twice the average thickness of the first and second internal electrodes 121 and 122.

The first and second outer electrodes 130 and 140 may be provided with voltages of the opposite polarities, may be disposed at opposing ends of the body 110 in the X direction, and may be electrically connected to exposed portions of the first and second inner electrodes 121 and 122.

The first and second external electrodes 130 and 140 include first and second conductive layers 131 and 141 formed on surfaces of the body 110 and connected to the first and second internal electrodes 121 and 122. The first and second external electrodes 130 and 140 further include first and second plating layers (e.g., 132 and 142) covering the first and second conductive layers 131 and 141, respectively.

The first and second external electrodes 130 and 140 may include first and second lead portions formed on the third and fourth surfaces 3 and 4 of the body 110 and first and second band portions extending from the first and second lead portions to portions of the first surface 1, which is the mounting surface of the body 110, respectively.

Here, the first and second band portions may further extend to portions of the fifth and sixth surfaces 5 and 6 of the body 110 and portions of the second surface 2 to enhance adhesive strength, or the like.

The first conductive layer 131 includes nickel (Ni) and barium titanate (BT).

An area of the first conductive layer 131 occupied by nickel with respect to a total area may be 30% to 65%.

For example, in a cross-section of the first conductive layer 131, an area occupied by nickel (e.g., nickel particles) in the cross section may be 30% to 65% of the total area of the cross section. In the example, the area occupied by nickel can be measured by taking one or more cross-section(s) of the conductive layer and measuring both the area occupied by nickel in the one or more cross-section(s) and the total area of the cross-section(s). Alternatively, the measurement of area occupied by nickel can be performed on a surface of the conductive layer by measuring both the area occupied by nickel on the surface of the conductive layer and the total area of the surface of the conductive layer. In some embodiments, the first conductive layer 131 may contain 30 vol % to 65 vol % of nickel, relative to 100 vol % of the first conductive layer 131.

More preferably, the area of the first conductive layer 131 occupied by nickel with respect to the total area may be 40% to 55%.

For example, in a cross-section of the first conductive layer 131, an area occupied by nickel (e.g., nickel particles) in the cross section may preferably be 40% to 55% of the total area of the cross section. In some embodiments, the first conductive layer 131 may preferably contain 40 vol % to 55 vol % of nickel, relative to 100 vol % of the first conductive layer 131.

The second conductive layer 141 includes nickel (Ni) and barium titanate (BT).

An area of the second conductive layer 141 occupied by nickel may be 30% to 65% with respect to the total area.

For example, in a cross-section of the second conductive layer 141, an area occupied by nickel (e.g., nickel particles) in the cross section may be 30% to 65% of the total area of the cross section. In some embodiments, the second conductive layer 141 may contain 30 vol % to 65 vol % of nickel, relative to 100 vol % of the second conductive layer 141.

More preferably, the area of the second conductive layer 141 occupied by nickel with respect to the total area may be 40% to 55%.

For example, in a cross-section of the second conductive layer 141, an area occupied by nickel (e.g., nickel particles) in the cross section may preferably be 40% to 55% of the total area of the cross section. In some embodiments, the second conductive layer 141 may preferably contain 40 vol % to 55 vol % of nickel, relative to 100 vol % of the second conductive layer 141.

If the area occupied by the nickel with respect to the total area of the first or second conductive layer 131 or 141 exceeds 65%, bonding with the internal electrodes may be excellent but bonding between the external electrodes and the body is poor. As such, a probability of cracking in the bonded surface of the body may increase and result in deterioration of moisture resistance and reliability.

Meanwhile, if the area occupied by the nickel with respect to the total area of the first or second conductive layers 131 and 141 is less than 30%, electrical connectivity may be degraded due to poor contact between the internal electrodes (121, 122) and the external electrodes (130, 140), and thus, capacity of the multilayer capacitor 100 may be reduced.

Here, the first and second plating layers of the first and second external electrodes 130 and 140 may include copper (Cu) plating layers 132 and 142, nickel plating layers 133 and 143 covering the copper plating layers 132 and 142, and tin (Sn) plating layers 134 and 144 covering the nickel plating layers 133 and 143, respectively.

Figure 4:
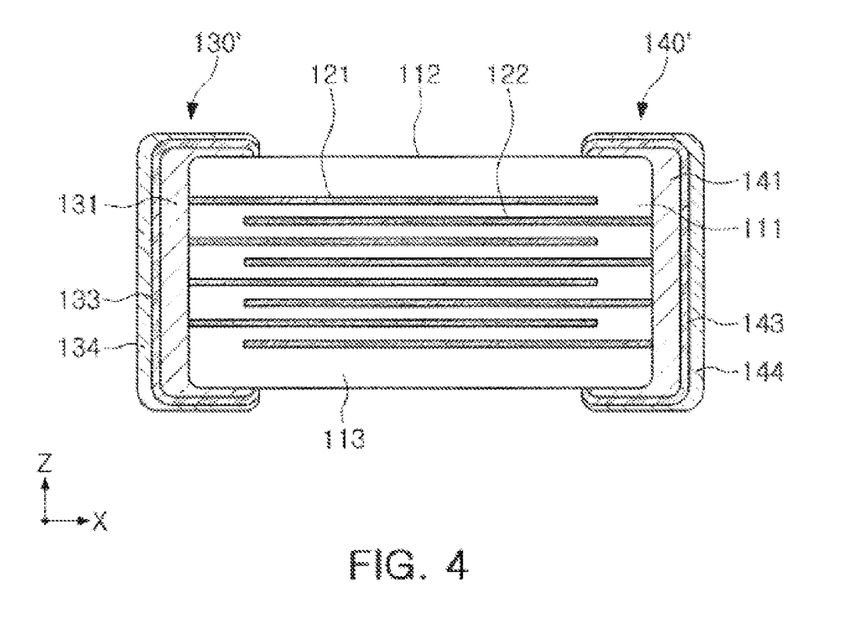
FIGS. 4 through 6 are cross-sectional views illustrating structures of external electrodes according to other exemplary embodiments of multilayer capacitors.

In another exemplary embodiment, referring to FIG. 4, the plating layers of first and second external electrodes 130' and 140' may include nickel plating layers 133 and 143 (e.g., disposed on the first or second conductive layers 131 and 141) and tin plating layers 134 and 144 covering the nickel plating layers 133 and 143, respectively.

Figure 5:
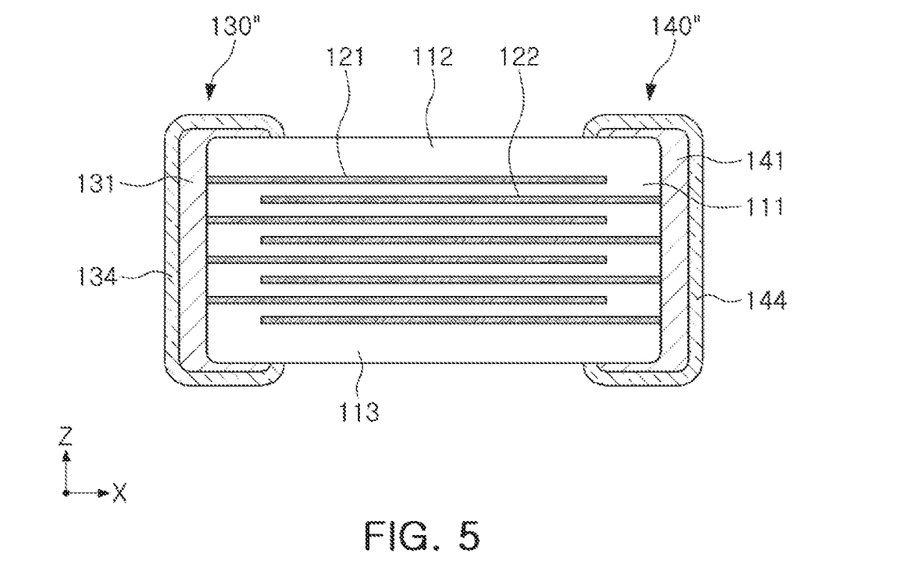

In another exemplary embodiment, referring to FIG. 5, the plating layers of first and second external electrodes 130" and 140" may be tin plating layers 134 and 144 (e.g., disposed on the first or second conductive layers 131 and 141).

According to the present disclosure, since the first and second conductive layers 131 and 141 are formed of sintered electrodes including nickel, bonding between the external electrodes and the dielectric and density thereof are excellent as compared with the related art sintered electrodes including copper, thereby improving moisture resistance reliability of the multilayer capacitor 100. In addition, after the first and second conductive layers 131 and 141 are formed, the body 110 and the first and second external electrodes 130 and 140 may be simultaneously sintered to be manufactured, simplifying the process reducing manufacturing cost.

Figure 6:
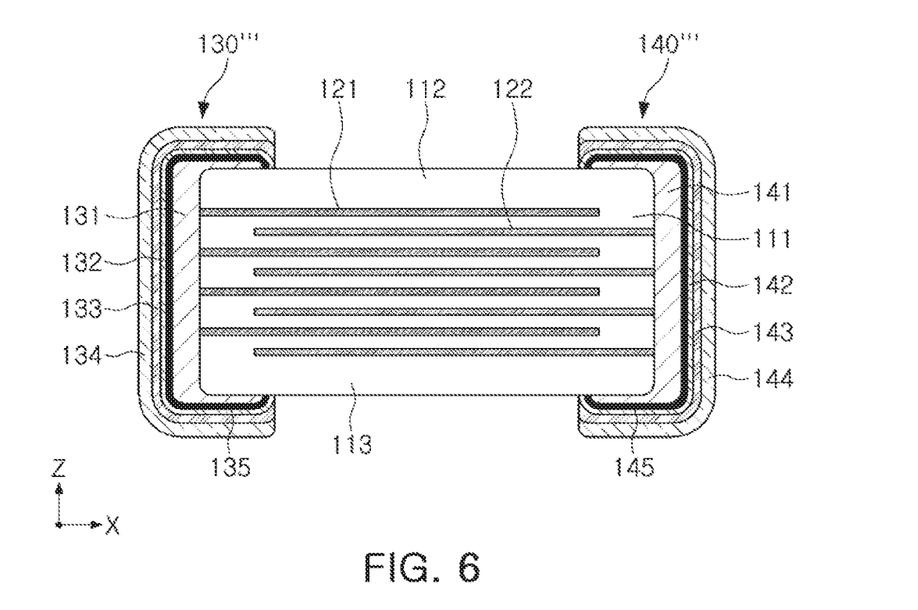

Referring to FIG. 6, first and second conductive resin layers 135 and 145 may be disposed between the first and second conductive layers 131 and 141 and the first and second plating layers, respectively.

The first and second conductive resin layers 135 and 145 may be formed to cover the ends of the first and second conductive layers 131 and 141, respectively.

That is, a distance from the end of the first surface 1 of the body 110 in the X direction to each of the ends of the band portions of the first and second conductive layers 131 and 141 is smaller than a distance from the end of the first surface 1 of the body 110 in the X direction to each of the ends of the band portions of the first and second conductive resin layers 135 and 145. For example, the first and second conductive resin layers 135 and 145 may be formed to extend over the ends of the first and second conductive layers 131 and 141, respectively. As shown in FIG. 6, the first and second conductive resin layers 135 and 145 may come in contact (e.g., direct contact) with a surface of the body 110 at a location adjacent to a point of contact between the first and second conductive layers 131 and 141 and the body 110.

In addition, the first and second conductive resin layers 135 and 145 provide a stress absorption effect, and may include a conductive metal and an epoxy.

Here, the conductive metal may be copper or nickel.

Experimental Example

Table 1 shows moisture resistance reliability of the body and average capacity of the multilayer capacitors tested according to changes in the area (NA) occupied by nickel with respect to the total area TA of the first or second conductive layer.

Here, the exemplary embodiment of the multilayer capacitor is manufactured to have a length of 20 mm and a width of 12 mm, have electrical characteristics of 10.0 uF, and have external electrodes including nickel and titanate.

Thereafter, a plating layer was formed by one of the structures illustrated in FIGS. 3 through 5, and 400 samples were evaluated under the conditions of 95° C., 95% RH, and 15 Vdc/um for 24 hours.

Here, as a ratio of the cross-sectional area, a cross-sectional area ratio of a lead portion in the conductive layer was observed.

Here, sample 1 is a comparative example in which the conductive layer includes copper instead of nickel.

TABLE 1

| | Structure of plating layer | NA/TA | Moisture resistance reliability/ number of defects | Average capacity |
|---|---|---|---|---|
| 1 | FIG. 4 | — | 10/400 | 105% |
| 2 | FIG. 3 | 0.55 | 0/400 | 104% |
| 3 | FIG. 4 | 0.55 | 0/400 | 107% |
| 4 | FIG. 5 | 0.55 | 0/400 | 105% |
| 5 | FIG. 3 | 0.13 | 0/400 | 56% |
| 6 | FIG. 3 | 0.21 | 0/400 | 75% |
| 7 | FIG. 3 | 0.30 | 0/400 | 100% |
| 8 | FIG. 3 | 0.41 | 0/400 | 106% |
| 9 | FIG. 3 | 0.65 | 0/400 | 107% |
| 10 | FIG. 3 | 0.68 | 3/400 | 105% |
| 11 | FIG. 3 | 0.79 | 8/400 | 104% |
| 12 | FIG. 3 | 0.95 | 13/400 | 106% |

Referring to Table 1, in the case of sample 1 as a comparative example, the moisture resistance reliability was confirmed to be poor.

Samples 2 to 4 were obtained by fixing the NA/TA to 0.55 and changing the structure of the plating layer to FIGS. 3 through 5, respectively. When the samples 2 to 4 are compared, there was no moisture resistance reliability and the average capacity was almost similar.

Therefore, it can be seen that there is no significant difference in moisture resistance reliability and average capacity according to the structure of the plating layers in FIGS. 3 through 5.

Samples 5 to 12 were obtained by forming a plating layer with the plating layer structure of FIG. 3 and changing the numerical values of NA/TA.

It can be seen that the samples 10 to 12 in which the NA/TA exceeds 0.65 have poor moisture resistance reliability.

Also, in the case of samples 5 and 6 in which the NA/TA is less than 0.30, moisture resistance reliability was not poor. However, since the nickel content was too small, poor contact between the internal electrodes and the external electrodes occurred and average capacities were 56% and 75%, respectively, significantly lower than that of sample 7.

Therefore, it can be seen that a desirable numerical value range of NA/TA that may prevent moisture resistance reliability failure while securing the average capacity is 0.3 to 0.65.

As set forth above, according to exemplary embodiments of the present disclosure, moisture resistance reliability of the multilayer capacitor may be improved.

While exemplary embodiments have been shown and described above, it will be apparent to those skilled in the art that modifications and variations could be made without departing from the scope of the present disclosure as defined by the appended claims.

What is claimed is:

1. A multilayer capacitor comprising:
   a body including a stacked structure formed of a plurality of dielectric layers and a plurality of internal electrodes; and
   a plurality of external electrodes, each including a conductive layer disposed at a respective end of the body and connected to a respective portion of the plurality of internal electrodes, and a plating layer covering the conductive layer,
   wherein, in each external electrode, the conductive layer includes nickel (Ni) and barium titanate (BT), an area occupied by nickel with respect to a total area of the conductive layer is 30% to 65%, and the plating layer directly contacts the conductive layer including nickel (Ni) and barium titanate (BT).

2. The multilayer capacitor of claim 1, wherein an area occupied by nickel with respect to the total area of the conductive layer is 40% to 55%.

3. The multilayer capacitor of claim 1, wherein the plating layer includes a copper (Cu) plating layer, a nickel plating layer covering the copper plating layer, and a tin (Sn) plating layer covering the nickel plating layer.

4. The multilayer capacitor of claim 1, wherein the plating layer includes a nickel plating layer and a tin plating layer covering the nickel plating layer.

5. The multilayer capacitor of claim 1, wherein the plating layer is a tin plating layer.

6. The multilayer capacitor of claim 1, wherein in the body, an average thickness of the plurality of dielectric layers is less than 2.8 μm, an average thickness of the plurality of internal electrodes is less than 1 μm, and the average thickness of the plurality of dielectric layers is equal to twice the average thickness of the plurality of internal electrodes.

7. A multilayer capacitor comprising:
a body including a stacked structure formed of a plurality of dielectric layers and a plurality of internal electrodes; and
a plurality of external electrodes, each including a conductive layer disposed at a respective end of the body and connected to a respective portion of the plurality of internal electrodes, and a plating layer covering the conductive layer,
wherein, in each external electrode, the conductive layer includes nickel (Ni) and barium titanate (BT), and an area occupied by nickel with respect to a total area of the conductive layer is 30% to 65%, and
the conductive layer of each of the plurality of external electrodes includes a lead portion disposed on the respective end surface of the body and connected to the respective portion of the plurality of internal electrodes, and a band portion including the nickel (Ni) and barium titanate (BT) and extending from the lead portion to a portion of a mounting surface of the body.

8. The multilayer capacitor of claim 7, further comprising:
a conductive resin layer disposed between the conductive layer and the plating layer,
wherein a distance from an end surface of the body to an end of the band portion of the conductive layer is shorter than a distance from the end surface of the body to an end of the band portion of the conductive resin layer.

9. The multilayer capacitor of claim 1, wherein the body includes first and second surfaces opposing each other, and third and fourth surfaces connected to the first and second surfaces and opposing each other, and includes the plurality of internal electrodes disposed to be alternately exposed to the third and fourth surfaces of the body with the dielectric layer interposed therebetween.

10. A multilayer capacitor comprising:
a body including a plurality of internal electrodes alternately stacked with dielectric layers therebetween; and
first and second external electrodes including lead portions disposed on opposing end surfaces of the body and contacting internal electrodes of the plurality of internal electrodes, and band portions extending from the lead portions onto a mounting surface abutting both end surfaces,
wherein the first and second external electrodes each includes a conductive layer extending in the band portion, including nickel (Ni), and with a material composition such that, in a cross-section of the conductive layer including the band portion, an area occupied by the nickel is 30% to 65% of the total area of the cross section.

11. The multilayer capacitor of claim 10, wherein the conductive layer of each of the first and second external electrodes includes nickel (Ni) and barium titanate (BT).

12. The multilayer capacitor of claim 10, wherein the conductive layer of each of the first and second external electrodes that includes nickel (Ni) directly contacts internal electrodes of the plurality of internal electrodes of the multilayer capacitor.

13. The multilayer capacitor of claim 10, wherein the conductive layer of each of the first and second external electrodes includes 30 vol % to 65 vol % of nickel (Ni) relative to 100 vol % of the conductive layer.

14. The multilayer capacitor of claim 10, wherein the conductive layer of each of the first and second external electrodes includes 40 vol % to 55 vol % of nickel (Ni) relative to 100 vol % of the conductive layer.

15. The multilayer capacitor of claim 10, wherein the plurality of internal electrodes includes pluralities of first and second internal electrodes that are alternately stacked with the dielectric layers therebetween, the first external electrode contacts only the first internal electrodes from among the first and second internal electrodes, and the second external electrode contacts only the second internal electrodes from among the first and second internal electrodes.

16. The multilayer capacitor of claim 10, wherein each of the first and second external electrodes includes the conductive layer in direct contact with the body and at least one plating layer including tin (Sn) covering the conductive layer.

17. The multilayer capacitor of claim 16, wherein each of the first and second external electrodes further includes a plating layer including copper (Cu) directly covering the conductive layer, a plating layer including nickel (Ni) directly covering the plating layer including copper (Cu), and the plating layer including tin (Sn) directly covering the plating layer including nickel (Ni).

18. The multilayer capacitor of claim 16, wherein each of the first and second external electrodes further includes a conductive resin layer disposed between the conductive layer including nickel (Ni) and the at least one plating layer covering the conductive layer.

19. The multilayer capacitor of claim 18, wherein the conductive resin layer extends over an entire surface and ends of the conductive layer including nickel (Ni) to directly contact a surface of the body.

* * * * *